United States Patent Office 3,004,068
Patented Oct. 10, 1961

3,004,068
CYCLOBUTENES CONTAINING TWO SUBSTITUTED METHYL SUBSTITUENTS
John Lynde Anderson, Winnetka, Ill., assignor to E. I. du Pont de Nemours and Company, Wilmington, Del., a corporation of Delaware
No Drawing. Filed Nov. 19, 1956, Ser. No. 622,810
3 Claims. (Cl. 260—563)

This invention relates to novel cyclobutenes and methods for preparing the same. This application is a continuation-in-part of Anderson application Serial No. 528,812 filed August 16, 1955.

Organic compounds having two functional groups are of considerable importance since they are utilized in the manufacture of condensation polymers useful as films, fibers, plastics, molding compositions, and the like. Certain difunctional compounds are currently being used in large quantities in commercial manufacture of condensation polymers, e.g., the polyesters and the polyamides. The specific properties of the polymers depend in large measure on the specific composition and structure of the difunctional components.

It is an object of the invention to provide new difunctional compounds having structures that impart new or improved properties to polymers or to other products made from them. It is a further object to provide new difunctional compounds that are capable of forming condensation polymers that can be cross-linked readily by heat.

These objects are accomplished by the present invention of cyclobutenes containing two —CH₂X annular substituents, where X, which can be the same or different in both groups, is hydroxyl or amino. The preferred cyclobutenes of this invention are those having the general formula

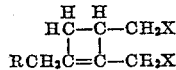

where R is hydrogen, phenyl, or alkyl or cycloalkyl of up to six carbon atoms, and X has the significance given above.

Cyclobutenes having two annular hydroxymethyl substituents are particularly useful for the preparation of thermosetting polyesters and polyurethanes, and therefore, are the most preferred group of the products of this invention. Cyclobutenes having two annular aminomethyl substituents form another especially useful group.

The cyclobutenes of this invention in which the —CH₂X substituents are —CH₂OH or —CH₂NH₂ are prepared by reduction of cyclobutenes having two Y annular substituents, wherein Y is carbalkoxy (—COOalkyl), and carbamyl (—CONH₂) or cyano (—CN) respectively, by means of a reducing agent capable of reducing the Y substituent but not the annular double bond, e.g., metallic hydrides such as lithium aluminum hydride or sodium borohydride.

The reduction of cyclobutenes having two carbalkoxy, carbamyl, or cyano annular substituents is preferably carried out by adding an ether solution of the substituted cyclobutene to an ether solution of lithium aluminum hydride at ordinary or slightly elevated temperatures. The reaction is conveniently carried out at the reflux temperature of the reaction system. An amount of lithium aluminum hydride at least equivalent to the carbalkoxy, carbamyl, or nitrile groups being reduced, and preferably an excess of lithium aluminum hydride, e.g., a 10% excess, is employed.

Diethyl ether, di-n-butyl ether, tetrahydrofuran and bis (β-ethoxyethyl)ethane are suitable reaction media for the reduction. Diethyl ether is very satisfactory for use in the reduction of cyclobutenes containing carbalkoxymethyl substituents, while tetrahydrofuran is preferred for the reduction of cyclobutenes having carbamylmethyl groups since it is a better solvent for this material than diethyl ether. The solvent used should be carefully purified prior to use in the process of this invention in order to remove water, alcohols, aldehydes, or ketones which may be present. Purification is conveniently done by treatment of the ether with sodium and, finally, by treatment with lithium aluminum hydride.

The reaction is substantially complete when the addition of the substituted cyclobutene to the lithium aluminum hydride solution is completed and the heat of reaction subsides (the reduction is exothermic). It is generally preferable to continue stirring the reaction mixture for a short time, e.g., one-half to one hour, after the addition is completed. At the completion of the reaction, excess lithium aluminum hydride is decomposed. This is conveniently done, in the case of a reaction mixture containing a hydroxymethyl substituted compound, by the addition of an ester, e.g., ethyl acetate. The reaction mixture is then treated with water containing a strong mineral acid, e.g., sulfuric acid or hydrochloric acid, to dissolve aluminum hydroxide which is formed as a by-product in the reduction.

In the case of a reaction mixture containing a cyclobutene bis(methylamine), the excess lithium aluminum hydride can be decomposed by adding the theoretical amount of water, or by the cautious addition of aqueous sodium hydroxide solution. When water only is used the aluminum hydroxide which precipitates is filtered from the reaction mixture before proceeding with the separation and isolation of the cyclobutene bis(methylamine).

The cyclobutene glycol or diamine is isolated from the organic portion of the reaction mixture by conventional means. For example, the ether layer of the reaction mixture is separated from the aqueous layer, dried, and then fractionally distilled.

In addition to the reduction with lithium aluminum hydride, as described above, the reduction of the carbalkoxy, carbamyl, or nitrile group can be accomplished with sodium borohydride in a similar procedure. With this reducing agent water or an alcohol can be used as reaction medium. After reduction is completed the excess sodium borohydride can be decomposed with a mineral acid, e.g., hydrochloric acid. The reaction product can then be worked up in the usual manner.

The starting materials used in the process of this invention are made by known methods. For example, dimethyl 1-cyclobutene-1,2-dicarboxylate is made by debromination of dimethyl 1,2-dibromocyclobutane-1,2-dicarboxylate by the method of Perkin, J. Chem. Soc. 65, 950 (1894), and dimethyl 3-cyclobutene-1,2-dicarboxylate is made by debromination of dimethyl 3,4-dibromocyclobutane-1,2-dicarboxylate with zinc dust by the method of Vogel, Angew. Chem. 66, 640 (1954).

The starting materials for the preferred products of this invention are those having the formula

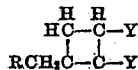

where R is hydrogen, phenyl, or alkyl or cycloalkyl of up to six carbon atoms and Y is carbalkoxy (—COOalkyl), carbamyl(—CONH₂), or nitrile(—CN) can be made by rearrangement of 3-alkylidene- (or 3-aralkylidene-) 1,2-cyclobutane dicarboxylic anhydrides having at least one hydrogen atom on the carbon of the alkylidene or aralkylidene group attached to the cyclobutane ring, by means of aqueous alkali, followed by acidification. The resulting dicarboxylic acids are then converted to the esters, amides, or nitriles by conventional methods. This process is described in U.S. Patent No. 2,848,478, to B. C. Pratt.

The 3-alkylidene- (or 3-aralkylidene-)cyclobutane-1,2-dicarboxylic anhydrides are in turn prepared by the addition of allenes of the formula

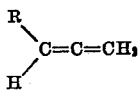

wherein R is as defined above, to maleic anhydride at temperatures of 150–250° C. in the absence of a polymerization initiator, and preferably in the presence of a polymerization inhibitor. This method is described in U.S. Patent 2,914,541.

The products and process of this invention are illustrated further by the following examples in which the proportions of ingredients are expressed in parts by weight unless otherwise specified.

*Example 1*

A solution of 21 parts of dimethyl 3-methyl-2-cyclobutene-1,2-dicarboxylate in 100 parts of diethyl ether is slowly added with stirring to 6.62 parts of lithium aluminum hydride in 125 parts of diethyl ether, 30 minutes being required. The reaction is exothermic and the reaction mixture refluxes slowly. When the addition is complete the reaction mixture is stirred for an additional one-half hour.

The excess lithium aluminum hydride in the reaction mixture is then decomposed by addition of 12 parts of ethyl acetate. Water, 100 parts, is then added to the reaction mixture, followed by 80 parts of 25% aqueous sulfuric acid. The ether layer is separated from the resulting reaction mixture, and the aqueous layer is extracted twice with diethyl ether. The ether layer and the ether extracts are combined, dried over anhydrous magnesium sulfate, and then distilled. There is obtained 8.5 parts of 3-methyl-2-cyclobutene-1,2-dimethanol boiling at 95–98° C./0.3 mm. and having a refractive index, $n_D^{25}$, of 1.4855. The infrared absorption spectrum obtained on this product indicates the presence of the hydroxyl group and the double bond.

When the process above is repeated using dimethyl 3-ethyl-2-cyclobutene-1,2-dicarboxylate,
dimethyl 3-n-hexyl-2-cyclobutene-1,2-dicarboxylate,
dimethyl 3-phenylmethyl-2-cyclobutene-1,2-dicarboxylate, or
dimethyl 3-cyclohexylmethyl-2-cyclobutene-1,2-dicarboxylate in place of dimethyl 3-methyl-2-cyclobutene-1,2-dicarboxylate there is obtained 3-ethyl-2-cyclobutene-1,2-dimethanol,
3-n-hexyl-2-cyclobutene-1,2-dimethanol,
3-phenylmethyl-2-cyclobutene-1,2-dimethanol, and
3-cyclohexylmethyl-2-cyclobutene-1,2-dimethanol.

*Example 2*

To a slurry of 15 parts of lithium aluminum hydride in 440 parts of tetrahydrofuran, purified by distillation from lithium aluminum hydride, is added 15.4 parts of finely powdered 3-methyl-2-cyclobutene-1,2-dicarboxamide in small portions over the course of 15 minutes. The mixture is stirred at reflux under a nitrogen atmosphere for 90 hours.

The complex is decomposed by the cautious addition of 95 parts of a solution of 50 parts of sodium hydroxide in 100 parts of water with stirring. The mixture is stirred for an additional 1.5 hours at room temperature. The upper tetrahydrofuran layer is decanted and the lower inorganic phase is washed with 133 parts of tetrahydrofuran by stirring them together vigorously. The tetrahydrofuran layer and washings are combined and dried over potassium hydroxide. The solvent is removed under reduced pressure on the steam bath. The residual oil amounts to 13 parts.

This crude 3 - methyl - 2 - cyclobutene - 1,2 - bis(methylamine) is distilled through a 12″ packed column and the portion boiling between 53 and 56° C. at 1.0 mm. is collected. It amounts to 3.6 parts and has a typical amine odor. Its infrared spectrum shows bands characteristic of an amine and, in addition, has a band at 5.95μ, which is typical of the double bond in the cyclobutene ring. The nuclear magnetic resonance spectrum of this product is consistent with the proposed structure.

When the process of Example 2 is repeated replacing the 3-methyl-2-cyclobutene-1,2-dicarboxamide with 3-ethyl-2-cyclobutene-1,2-dicarboxamide,
3-n-hexyl-2-cyclobutene-1,2-dicarboxamide,
3-phenylmethyl-2-cyclobutene-1,2-dicarboxamide, or
3 - cyclohexylmethyl - 2 - cyclobutene - 1,2 - dicarboxamide there is obtained 3-ethyl-2-cyclobutene-1,2-bis(methylamine),
3-n-hexyl-2-cyclobutene-1,2-bis(methylamine),
3 - phenylmethyl - 2 - cyclobutene - 1,2 - bis(methylamine), and
3 - cyclohexylmethyl - 2 - cyclobutene - 1,2 - bis(methylamine).

The cyclobutenes of this invention, having two annular $CH_2X$ substituents, where X is hydroxyl or amino, are especially suitable for reaction with complementary bifunctional reactants to form condensation polymers containing a cyclobutene ring in the main polymer chain, which polymers are readily cross-linked by heating to temperatures of 100–325° C.

For example, a cross-linkable polyester can be made by condensing 3-methyl - 2 - cyclobutene-1,2-dimethanol with a dicarboxylic acid or ester-forming derivative thereof, e.g., adipic acid, terephthalic acid, or an anhydride, acid halide, or ester thereof, at temperatures below about 100° C. in order to avoid cross-linking during the preparation of the polymer. Such polyesters containing cyclobutene rings are of particular value for use in the formation of laminates and finishes which are very rapidly set by heat alone after being formed into the desired shapes. They are also useful for the formation of fibers and films which are cross-linked by heating to prevent shrinkage and to increase their solvent resistance.

The cyclobutene glycols included by this invention are also useful for condensation with diisocyanates to form thermosetting polyurethanes. For example, 3-methyl-2-cyclobutene-1,2-dimethanol is reacted with hexamethylene diisocyanate to form a polyurethane which is cross-linked by heating to 100–300° C. to an infusible and insoluble polymer.

The cyclobutene bis(methylamines) of this invention can also form chelates with metals, e.g., the chelate formed from 3-methyl - 2 - cyclobutene-1,2-bis(methylamine) and copper perchlorate in alcohol solution, which are useful as sequestering agents for metal ions.

I claim:
1. A cyclobutene having the general formula

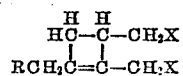

where R is selected from the group consisting of hydrogen, alkyl and cycloalkyl of up to six carbon atoms, and the phenyl radical and X is selected from the group consisting of the hydroxyl radical and the amino radical.

2. 3-methyl-2-cyclobutene-1,2-dimethanol.
3. 3-methyl-2-cyclobutene-1,2-bis(methylamine).

References Cited in the file of this patent

UNITED STATES PATENTS 2,601,075     Wicklatz et al. _____ June 17, 1952

OTHER REFERENCES

Willstatter et al.: Ber. Deut. Chem., 40, 3996–7 (1907).
Reppe et al.: 43, Chem. Abst., 6199 (1949).
Mousseron et al.: Societe Chimique de France, volume 19, pages 1046, 1046 (1952).
Vogel: Angew. Chemie, 66, 640–1 (1954).